(12) United States Patent
Sorace et al.

(10) Patent No.: US 12,126,248 B2
(45) Date of Patent: Oct. 22, 2024

(54) CONTROL METHOD AND CONTROLLER FOR SIMO SWITCHING CONVERTERS

(71) Applicant: NXP B.V., Eindhoven (NL)

(72) Inventors: Christian Vincent Sorace, Falicon (FR); Nicolas Patrick Vantalon, Cannes (FR); Ludovic Oddoart, Opio (FR); Fabien Boitard, Mouans Sartoux (FR)

(73) Assignee: NXP B.V., Eindhoven (NL)

( * ) Notice: Subject to any disclaimer, the term of this patent is extended or adjusted under 35 U.S.C. 154(b) by 85 days.

(21) Appl. No.: 17/651,689

(22) Filed: Feb. 18, 2022

(65) Prior Publication Data

US 2022/0271642 A1    Aug. 25, 2022

(30) Foreign Application Priority Data

Feb. 23, 2021    (EP) .................................... 21290009

(51) Int. Cl.
     *H02M 3/158*      (2006.01)
     *H02M 1/00*      (2007.01)

(52) U.S. Cl.
     CPC ........... *H02M 1/009* (2021.05); *H02M 3/158* (2013.01)

(58) Field of Classification Search
     CPC .................... H02M 1/009; H02M 3/155–1588
     See application file for complete search history.

(56) References Cited

U.S. PATENT DOCUMENTS

| | | | |
|---|---|---|---|
| 5,617,015 A * | 4/1997 | Goder | H02M 3/155 323/285 |
| 6,437,545 B2 | 8/2002 | Sluijs | |
| 6,636,022 B2 | 10/2003 | Sluijs | |
| 7,432,614 B2 | 10/2008 | Ma et al. | |
| 8,049,472 B2 * | 11/2011 | Easwaran | H02M 3/158 323/283 |
| 8,624,429 B2 | 1/2014 | Jing et al. | |
| 9,007,039 B2 | 4/2015 | Kim et al. | |
| 9,099,919 B2 | 8/2015 | Jing et al. | |
| 9,692,296 B1 * | 6/2017 | Dash | H02M 3/1588 |
| 10,170,990 B2 | 1/2019 | Calhoun et al. | |
| 10,796,830 B1 | 10/2020 | Sorace et al. | |
| 2002/0093315 A1 | 7/2002 | Sluijs | |
| 2014/0285014 A1 * | 9/2014 | Calhoun | H02M 3/158 307/31 |

* cited by examiner

*Primary Examiner* — Peter M Novak

(57) ABSTRACT

There is described a method of controlling a single inductor multiple output, SIMO, switching converter, the method comprising (a) counting, for each output of the multiple outputs of the SIMO switching converter, a period of time during which an output voltage at the respective output is below a corresponding individual threshold value, (b) identifying that output among the multiple outputs of the SIMO switching converter for which the counted period of time is longest, and (c) connecting the identified output to the single inductor of the SIMO switching converter to supply current from the single inductor of the SIMO switching converter to the identified output. Furthermore, a corresponding controller is described.

20 Claims, 13 Drawing Sheets

CONTROL METHOD AND CONTROLLER FOR SIMO SWITCHING CONVERTERS

CROSS-REFERENCE TO RELATED APPLICATIONS

This application claims the priority under 35 U.S.C. § 119 of European Patent application no. 21290009.6, filed on 23 Feb. 2021, the contents of which are incorporated by reference herein.

TECHNICAL FIELD

The present disclosure relates to the field of single inductor multiple output (SIMO) switching converters. More specifically, the present disclosure relates to a method of controlling a SIMO switching converter and to a controller for a SIMO switching converter.

ART BACKGROUND

SIMO switching converters are widely used for supplying multiple consumers in electronic devices (e.g., low power applications in mobile devices, such as Bluetooth Low Energy, Internet of Things applications, medical applications, etc.) with appropriate voltages derived from a single voltage source. However, in some cases an insufficient voltage supply may occur for one (or more) consumer(s) while other consumers are being sufficiently supplied. Depending on the specific consumer such a lack of supply can be detrimental to the function of the entire device and in some cases even result in hazardous situations due to instability or shutdown of important functions.

There may thus be a need for a way of avoiding the above-mentioned drawbacks of conventional SIMO switching converters, in particular to maintain adequate power supply to important or vital consumers.

SUMMARY

This need may be met by the subject matter according to the independent claims. Advantageous embodiments of the present disclosure are set forth in the dependent claims.

According to a first aspect, there is provided a method of controlling a single inductor multiple output, SIMO, switching converter, the method comprising (a) counting, for each output of the multiple outputs of the SIMO switching converter, a period of time during which an output voltage at the respective output is below a corresponding individual threshold value, (b) identifying that output among the multiple outputs of the SIMO switching converter for which the counted period of time is longest, and (c) connecting the identified output to the single inductor of the SIMO switching converter to supply current from the single inductor of the SIMO switching converter to the identified output.

This aspect is based on the idea that the voltage at each output of the SIMO switching converter is monitored relative to an individual (i.e., output specific) threshold value, and a period of time is counted during which the output voltage has been below the corresponding threshold value. The output for which the counted period of time is longest is then identified and supplied with current from the SIMO inductor in order to regulate the corresponding output voltage to a desired level. In other words, the output which has shown too low voltage output for the longest period of time is selected to be supplied next.

In the present context, the term "counting" may denote any way of counting or measuring a period of time, in particular by accumulating, integrating, adding, or incrementing values, amounts, numbers, or periods.

According to an embodiment, the method further comprises resetting the counted period of time for the identified output to zero.

By resetting the counter for the identified output, it is assured that other outputs in need of current supply can be selected next. In some cases, the counter is not reset until it is assured that the voltage at the selected output has increased enough to exceed the corresponding threshold value, which may take several supply cycles to achieve.

According to a further embodiment, each output of the SIMO switching converter is coupled to a corresponding comparator adapted to provide a comparator output signal indicative of whether the corresponding output voltage is below the corresponding individual threshold value or not. Furthermore, the counting comprises synchronously incrementing the counted period of time for those outputs where the corresponding comparator output value indicates that the output voltage is below the corresponding individual threshold value.

In other words, the counted periods of time are synchronously incremented for those outputs where the corresponding comparator output signals indicate that the output voltages are below the respective threshold values.

According to a further embodiment, the synchronous incrementing occurs with a predetermined clock frequency which exceeds a switching frequency of the SIMO switching converter.

The predetermined clock frequency may in particular be several multiples of two times the switching frequency of the SIMO switching converter, such as at least 8 times the switching frequency of the SIMO switching converter, such as 32 times or 256 times the switching frequency of the SIMO switching converter.

By using a relatively high frequency as the predetermined clock frequency precise information regarding the state of the respective output voltages can be obtained.

According to a further embodiment, the synchronous incrementing comprises incrementing the counted period of time by a predetermined amount.

The predetermined amount may in particular be equal to one such that the counted period of time is measured in clock cycles. Alternatively, the predetermined amount may be equal to the duration of one period of the clock signal. As a further alternative, the predetermined amount may be equal to the actual duration of time where the output voltage is below its corresponding threshold value.

According to a further embodiment, the predetermined amount is individual for each output.

In other words, one predetermined amount may be used for one output (or for more outputs) and another predetermined amount may be used for another output (or for other outputs). This is particularly useful in order to assure that the counted period of time increases more rapidly for one output (or for some outputs) than it does for another output (or for other outputs). In this way, one output (or a few outputs) that is (are) used to supply more important functions will be identified and supplied sooner than other outputs that supply less important functions. This may be implemented in several ways, e.g. by adding an additional value per counted clock cycle, by multiplying the counted number of clock cycles with a factor, or by applying weighting in any other way known to the skilled person. It should be noted that as a result of the weighting, the term "counted period of time"

does not necessarily reflect the actual amount of time such that if the "counted period of time" is equal for two outputs, one of the outputs may in reality have had a voltage below its threshold value for a shorter amount of time than the other one.

According to a further embodiment, current is supplied by the single inductor of the SIMO switching converter to the identified output until the single inductor is completely discharged.

In other words, the SIMO switching converter is operated in so-called discontinuous conduction mode (DCM). This is beneficial in order to avoid disturbances when switching from supplying one output with current to supplying another output with current from the single inductor. In addition, the above inductor current power scheme is called multiple charge, multiple discharge.

In an alternative embodiment, current is supplied by the single inductor of the SIMO switching converter to the identified output until the single inductor current has decreased to a predetermined minimum current (above zero). A free wheel switch may be provided to maintain the inductor current close to the predetermined minimum current until the next charging/discharging of the single inductor. Thereby, the overall current level in the inductor is larger in comparison to the DCM operation described above. This is also referred to as a pseudo continuous conduction mode (PCCM).

According to a further embodiment, the method further comprises disconnecting the identified output from the single inductor and waiting for a predetermined waiting period of time before connecting a subsequently identified output to the single inductor to supply current to the subsequently identified output.

In other words, once the inductor current reaches zero and the identified output is disconnected from the single inductor, the predetermined waiting period of time is applied before a subsequently identified output is connected to receive current from the single inductor. This further reduces the risk of disturbances, in particular so-called cross regulation issues between the outputs, when switching from the previously identified output to the next identified output.

According to a further embodiment, the SIMO switching converter is a SIMO BUCK switching converter.

In other words, all outputs of the switching converter are supplied with a voltage that is lower than the (battery) voltage used to charge the single inductor.

According to a further embodiment, at least one output is a high-priority output, the method further comprising identifying the high-priority output instead of the output among the multiple outputs of the SIMO switching converter for which the counted period of time is longest if the voltage at the high-priority output is below the individual threshold value of the high-priority output. This may e.g., be achieved through an under voltage comparator masking the counting of the other outputs.

In this embodiment, if the voltage at the high-priority output is below the corresponding threshold value, the high-priority output is selected to be charged independently of whether longer periods of time has been counted for other outputs. Thus, as soon as the high-priority output needs to be supplied, it will be connected to the single inductor independently of the demands of other outputs.

According to a second aspect, there is provided a controller for a single inductor multiple output, SIMO, switching converter, the controller comprising (a) a request management unit configured to count, for each output of the multiple outputs of the SIMO switching converter, a period of time during which an output voltage at the respective output is below a corresponding individual threshold value, (b) an arbitration logic unit configured to identify that output among the multiple outputs of the SIMO switching converter for which the counted period of time is longest, and (c) a finite state machine configured to connect the identified output to the single inductor of the SIMO switching converter to supply current from the single inductor of the SIMO switching converter to the identified output.

This aspect is essentially based on the same idea as the first aspect discussed above and provides a controller capable of implementing and performing the method according to the first aspect. It should be noted that the "request management unit", the arbitration logic unit", and the "finite state machine" denote functional units, which may or may not be separate entities. The functional units may in particular be implemented as software or hardware functional units or as functional units in an application specific integrated circuit (ASIC) or as part of a control circuit or module.

According to a further embodiment, the request management unit is further configured to reset the counted period of time for the identified output to zero in response to a corresponding signal from the finite state machine.

By resetting the counter for the identified output, it is assured that other outputs in need of current supply can be selected next. In some cases, the counter is not reset until it is assured that the voltage at the selected output has increased enough to exceed the corresponding threshold value, which may take several supply cycles to achieve.

According to a further embodiment, each output of the SIMO switching converter is coupled to a corresponding comparator adapted to provide a comparator output signal indicative of whether the corresponding output voltage is below the corresponding individual threshold value or not. Furthermore, the request management unit is further configured to synchronously increment the counted period of time for those outputs where the corresponding comparator output value indicates that the output voltage is below the corresponding individual threshold value.

In other words, the counted periods of time are synchronously incremented for those outputs where the corresponding comparator output signals indicate that the output voltages are below the respective threshold values.

According to a further embodiment, the request management unit is configured to synchronously increment the counted periods of time with a predetermined clock frequency which exceeds a switching frequency of the SIMO switching converter.

The predetermined clock frequency may in particular be several multiples of two times the switching frequency of the SIMO switching converter, such as at least 8 times the switching frequency of the SIMO switching converter, such as 32 times or 256 times the switching frequency of the SIMO switching converter.

By using a relatively high frequency as the predetermined clock frequency precise information regarding the state of the respective output voltages can be obtained.

According to a further embodiment, the request management unit is configured to synchronously increment the counted periods of time by a predetermined amount.

The predetermined amount may in particular be equal to one such that the counted period of time is measured in clock cycles. Alternatively, the predetermined amount may be equal to the duration of one period of the clock signal. As a further alternative, the predetermined amount may be equal to the actual duration of time where the output voltage is below its corresponding threshold value.

According to a further embodiment, the predetermined amount is individual for each output.

In other words, one predetermined amount may be used for one output (or for more outputs) and another predetermined amount may be used for another output (or for other outputs). This is particularly useful in order to assure that the counted period of time increases more rapidly for one output (or for some outputs) than it does for another output (or for other outputs). In this way, one output (or a few outputs) that is (are) used to supply more important functions will be identified and supplied sooner than other outputs that supply less important functions. This may be implemented in several ways, e.g. by adding an additional value per counted clock cycle, by multiplying the counted number of clock cycles with a factor, or by applying weighting in any other way known to the skilled person. It should be noted that as a result of the weighting, the term "counted period of time" does not necessarily reflect the actual amount of time such that if the "counted period of time" is equal for two outputs, one of the outputs may in reality have had a voltage below its threshold value for a shorter amount of time than the other one.

According to a further embodiment, current is supplied by the single inductor of the SIMO switching converter to the identified output until the single inductor is completely discharged.

In other words, the SIMO switching converter is operated in so-called discontinuous conduction mode (DCM). This is beneficial in order to avoid disturbances when switching from supplying one output with current to supplying another output with current from the single inductor. In addition, the above inductor current power scheme is called multiple charge, multiple discharge.

According to a further embodiment, the finite state machine is configured to disconnect the identified output from the single inductor and wait for a predetermined waiting period of time before connecting a subsequently identified output to the single inductor to supply current to the subsequently identified output.

In other words, once the inductor current reaches zero and the identified output is disconnected from the single inductor, the predetermined waiting period of time is applied before a subsequently identified output is connected to receive current from the single inductor. This further reduces the risk of disturbances, in particular so-called cross regulation issues between the outputs, when switching from the previously identified output to the next identified output.

According to a further embodiment, the SIMO switching converter is a SIMO BUCK switching converter.

In other words, all outputs of the switching converter are supplied with a voltage that is lower than the (battery) voltage used to charge the single inductor.

According to a further embodiment, at least one output is a high-priority output, and wherein the arbitration logic unit is configured to identify the high-priority output instead of the output among the multiple outputs of the SIMO switching converter for which the counted period of time is longest if the voltage at the high-priority output is below the individual threshold value of the high-priority output.

In this embodiment, if the voltage at the high-priority output is below the corresponding threshold value, the high-priority output is selected to be charged independently of whether longer periods of time has been counted for other outputs. Thus, as soon as the high-priority output needs to be supplied, it will be connected to the single inductor independently of the demands of other outputs.

It should be noted that exemplary embodiments have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present disclosure will be apparent from the examples of embodiment to be described hereinafter and are explained with reference to the examples of embodiment. Aspects of the present disclosure will be described in more detail hereinafter with reference to examples of embodiment to which the present disclosure is, however, not limited.

DETAILED DESCRIPTION

Figure 1:
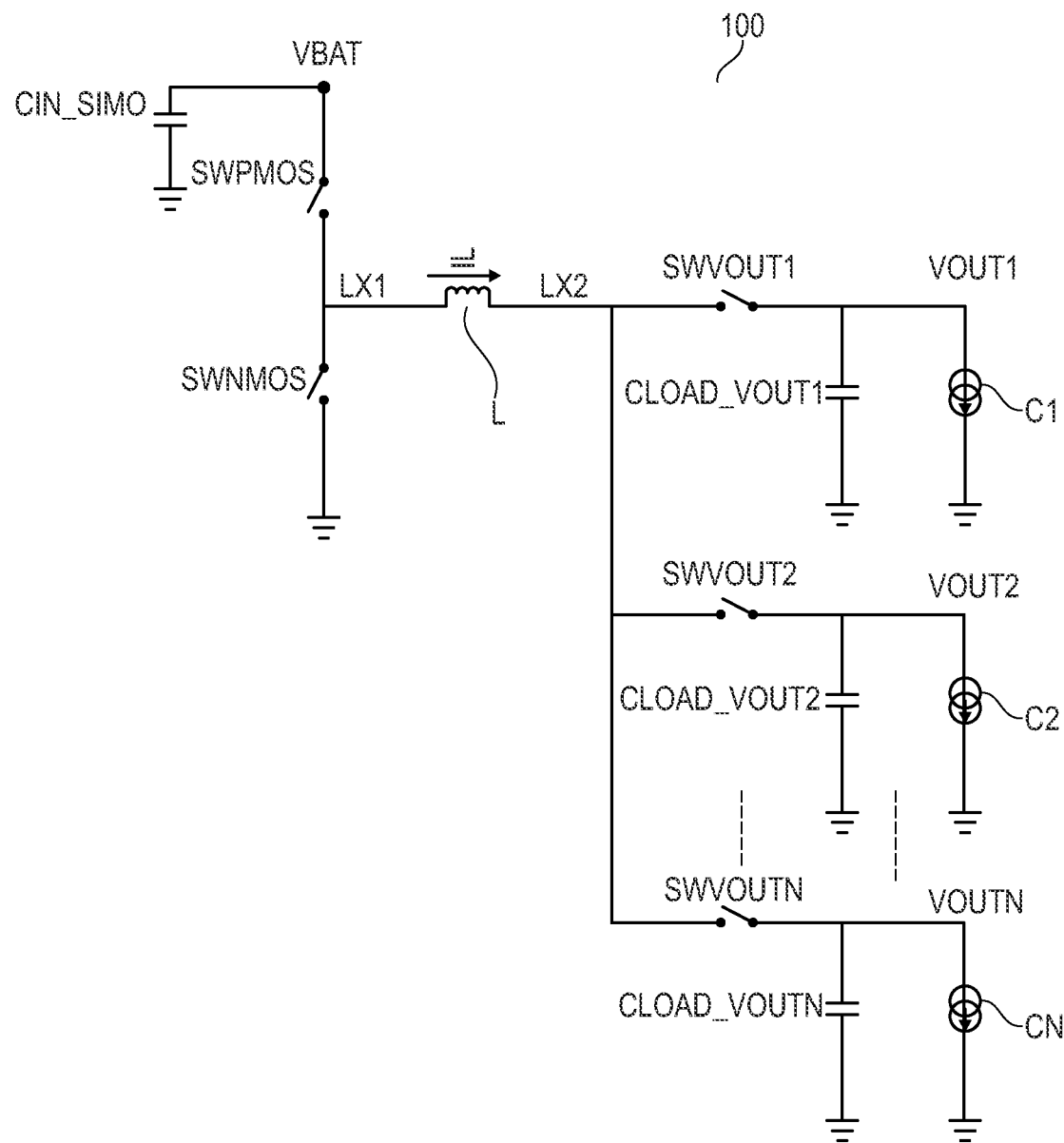
FIG. 1 shows a circuit diagram of a SIMO switching converter according to an exemplary embodiment.

The illustration in the drawing is schematic. It is noted that in different figures, similar or identical elements are provided with the same reference signs or with reference signs, which differ only within the first digit.

FIG. 1 shows a circuit diagram of a SIMO switching converter 100 according to an exemplary embodiment. The SIMO switching converter 100 comprises two switches SWPMOS and SWNMOS arranged in series between supply terminal VBAT and ground. A first inductor terminal LX1 is provided at the connection between the two switches SWPMOS and SWNMOS. A decoupling capacitor CIN_SIMO is coupled between the supply terminal VBAT and ground. The inductor L of the SIMO switching converter 100 is coupled between the first inductor terminal LX1 and a second inductor terminal LX2. The latter is coupled to a plurality of switches SWVOUT1, SWVOUT2, . . . , SWVOUTN which are operable to close a connection to a corresponding output terminal VOUT1, VOUT2, . . . , VOUTN. Each output terminal VOUT1, VOUT2, . . . , VOUTN is connected to a corresponding output capacitor CLOAD_VOUT1, CLOAD_VOUT2, ..., CLOAD_VOUT2, and to a corresponding consumer C1, C2, ..., CN. In operation, only one of the switches SWVOUT1, SWVOUT2, ..., SWVOUTN will be closed at a time such that current from the single inductor L will be supplied to only one of the output terminals VOUT1, VOUT2, ..., VOUTN at a time. It should be emphasized that care has to be taken to assure there is absolutely no overlap where both SWPMOS and SWNMOS are closed at the same time. Similarly, no overlap may occur in the switching of SWVOUT1, SWVOUT2, ..., SWVOUTN, i.e. none of these switches can be closed at the same time. The single inductor L is charged by closing the switch SWPMOS while the switch SWNMOS is open. Similarly, the single inductor L is discharged by opening the switch SWPMOS and closing the switch SWNMOS. When both switches SWPMOS and SWNMOS are open, no current will flow through the single inductor L.

Figure 2A:
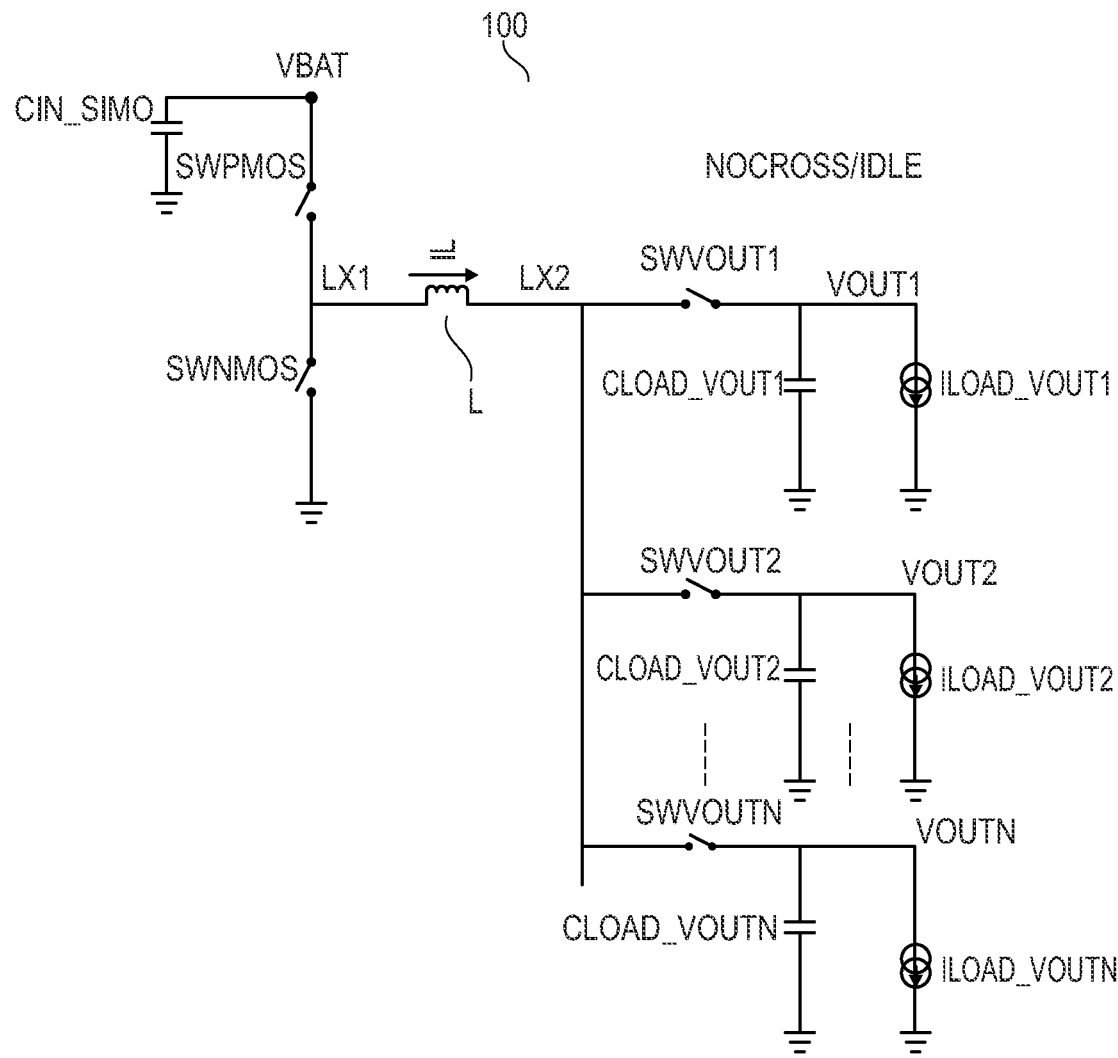
FIGS. 2A through 2C show circuit diagrams of SIMO switching converters according to exemplary embodiments operating in an idle state.
Figure 2B:
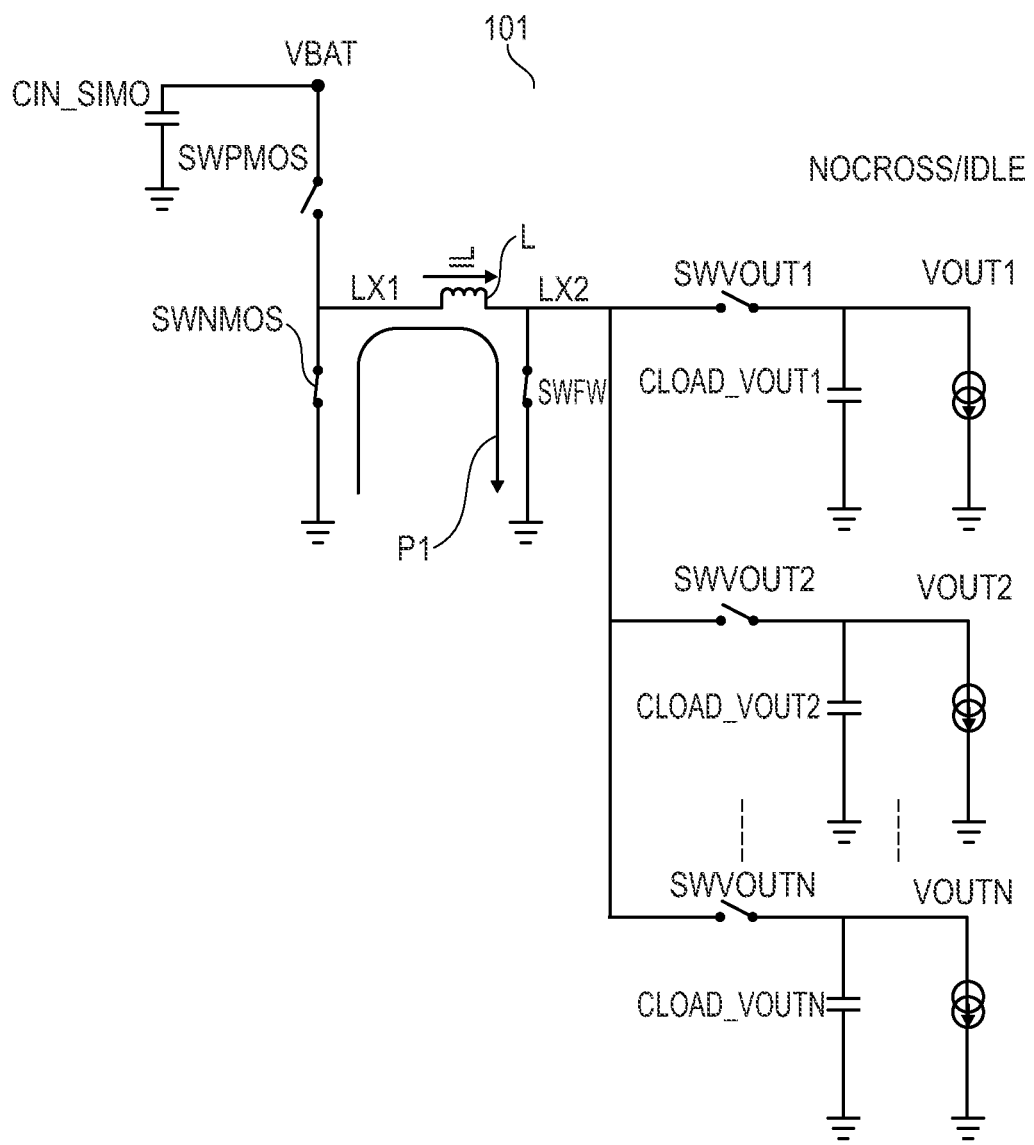
Figure 2C:
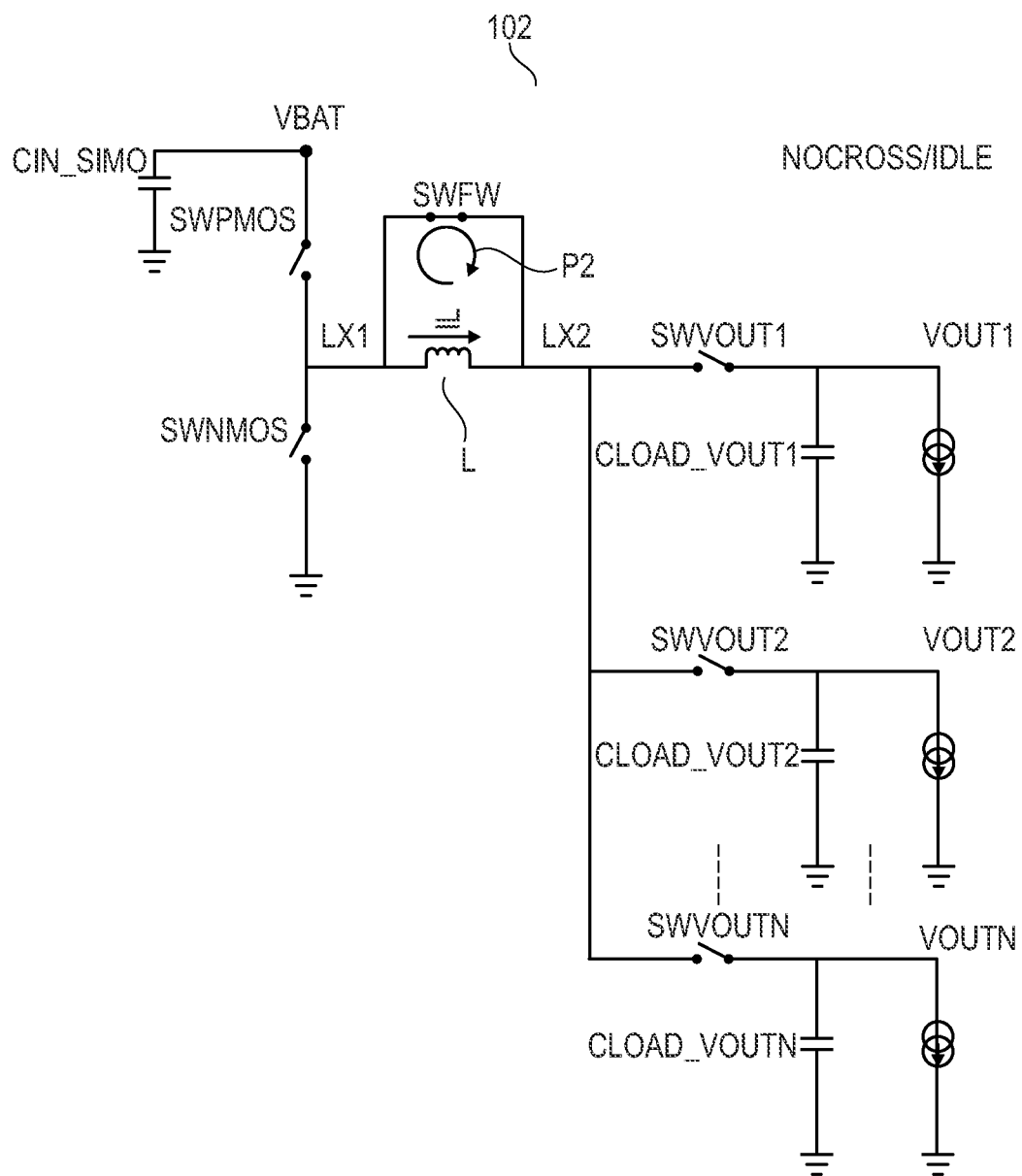

FIGS. 2A through 2C show circuit diagrams of SIMO switching converters according to exemplary embodiments operating in an idle state. More specifically, FIG. 2A shows the SIMO switching converter 100 discussed above in conjunction with FIG. 1. As shown, all switches SWPMOS, SWNMOS, SWVOUT1, SWVOUT2, ..., SWVOUTN are open such that the converter is operating in an idle state, which is particularly useful between supply cycles to assure that one output does not disturb another output, as would, e.g., be the case if two outputs were connected simultaneously to the inductor L. Hence, this operating state is also referred to as a NOCROSS/IDLE state. FIG. 2B shows a similar but slightly different SIMO switching converter 101 comprising an additional free wheel switch SWFW coupled between the second inductor terminal LX2 and ground. The additional switch SWFW makes it possible to discharge the single inductor L by closing both SWNMOS and SWFW such that the inductor current IL follows the current path P1. FIG. 2C shows another implementation of the free wheel switch SWFW. In this example, the free wheel switch SWFW is arrange between the two inductor terminals LX1 and LX2. Hence, when the switch SWFW is closed, the inductor current IL will follow the loop-shaped current path P2.

Figure 3A:
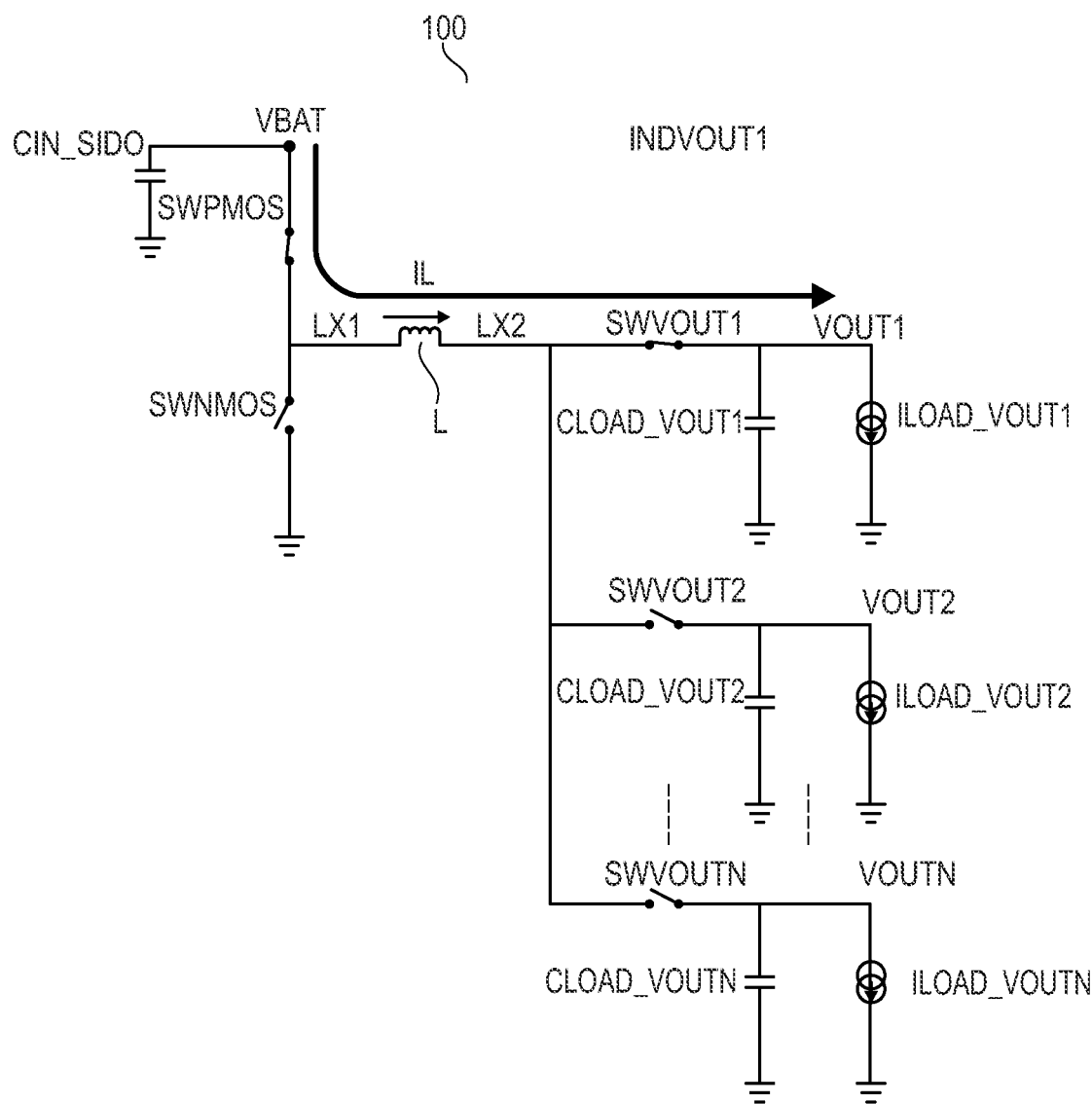
FIGS. 3A and 3B show circuit diagrams of a SIMO switching converter according to an exemplary embodiment operating to supply an output.
Figure 3B:
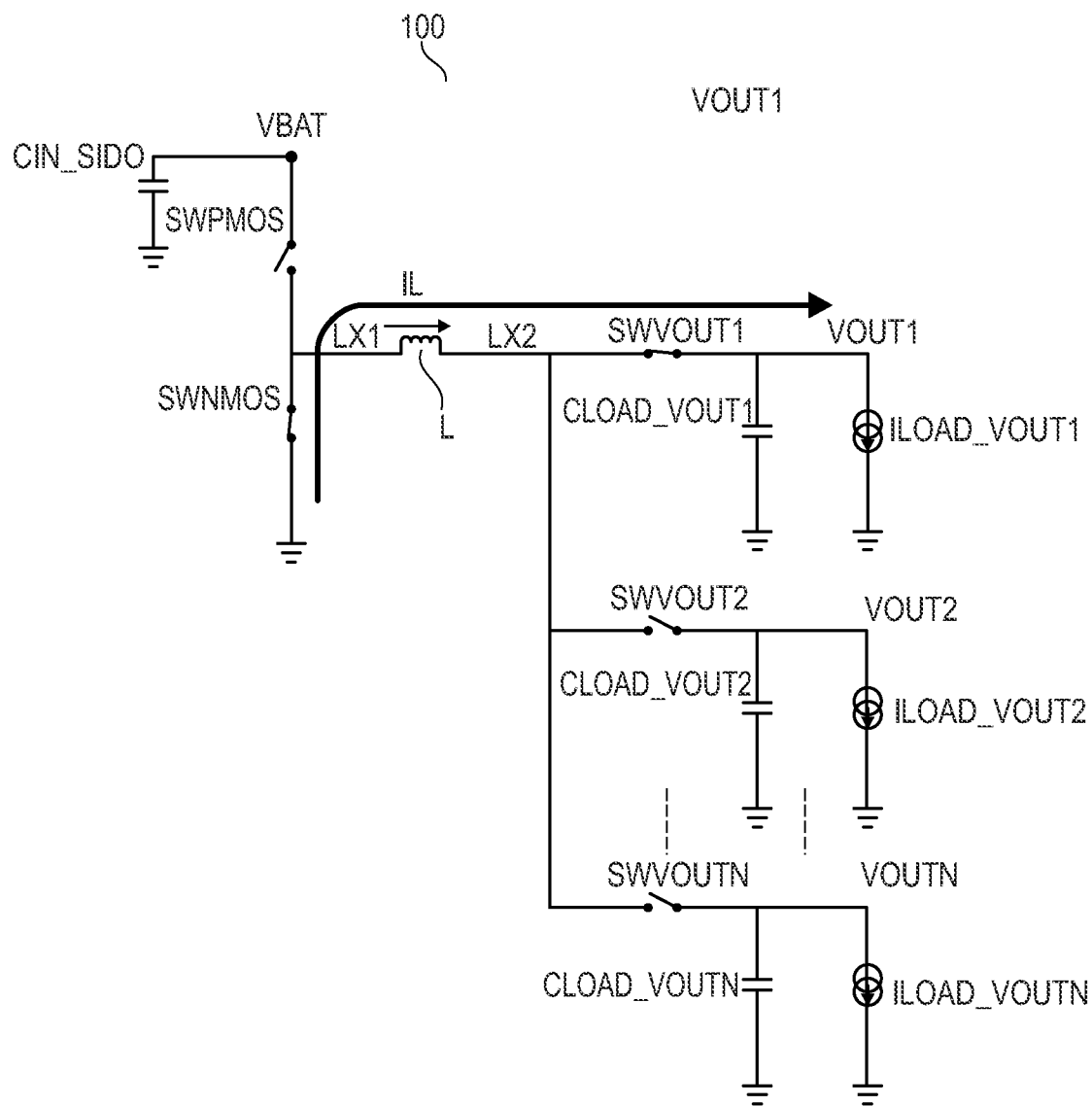

FIGS. 3A and 3B show circuit diagrams of a SIMO switching converter 100 according to an exemplary embodiment operating to supply an output. More specifically, FIG. 3A shows the SIMO switching converter 100 in a state where the single inductor L is being charged and the inductor current IL is supplied to the first output terminal VOUT1. That is, the switches SWPMOS and SWVOUT1 are closed while the switches SWNMOS, SWVOUT2, ..., SWVOUTN are all open. As shown, the inductor current IL flows from the supply terminal VBAT through switch SWPMOS, through the single inductor L, through the switch SWVOUT1 and on towards the first output terminal VOUT1. FIG. 3B shows the SIMO switching converter 100 in a state where the single inductor L is being discharged while the inductor current is still being supplied to the first output terminal VOUT1. This state only differs from the charging state in that the switch SWPMOS is now open while the switch SWNMOS is closed instead. As shown, the inductor current IL now flows from ground through switch SWNMOS, through the single inductor L, through the switch SWVOUT1 and on towards the first output terminal VOUT1. Any of the other output terminals VOUT2, ..., VOUTN can be supplied in a similar manner by closing the corresponding switch SWVOUT2, ..., SWVOUTN and operating the switches SWPMOS and SWNMOS as shown in FIG. 3A and FIG. 3B.

Figure 4:
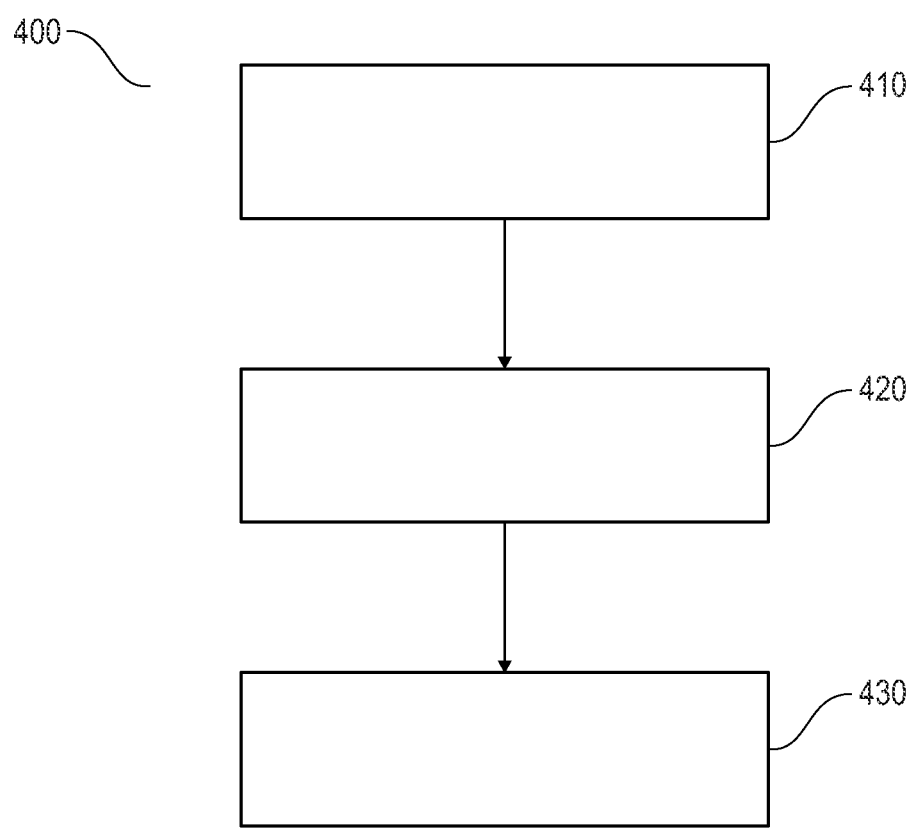
FIG. 4 shows a flow chart of a method of controlling a SIMO switching converter in accordance with an exemplary embodiment.

FIG. 4 shows a flow chart of a method 400 of controlling a SIMO switching converter, such as any of the SIMO switching converters 100, 101, 102 described above in conjunction with FIGS. 1-3, in accordance with an exemplary embodiment. At 410, the method comprises a step of counting, for each output of the multiple outputs VOUT1, VOUT2, ..., VOUTN of the SIMO switching converter 100, 101, 102, a period of time during which an output voltage at the respective output is below a corresponding individual threshold value. At 420, the method 400 comprises a step of identifying that output among the multiple outputs VOUT1, VOUT2, ..., VOUTN of the SIMO switching converter for which the counted period of time is longest. At 430, the method 400 comprises a step of connecting the identified output to the single inductor of the SIMO switching converter to supply current from the single inductor of the SIMO switching converter to the identified output. In short, the control method monitors the output voltages of the SIMO switching converter during operation and selects that output for which the counted period of time is longest to be supplied next.

Figure 5:
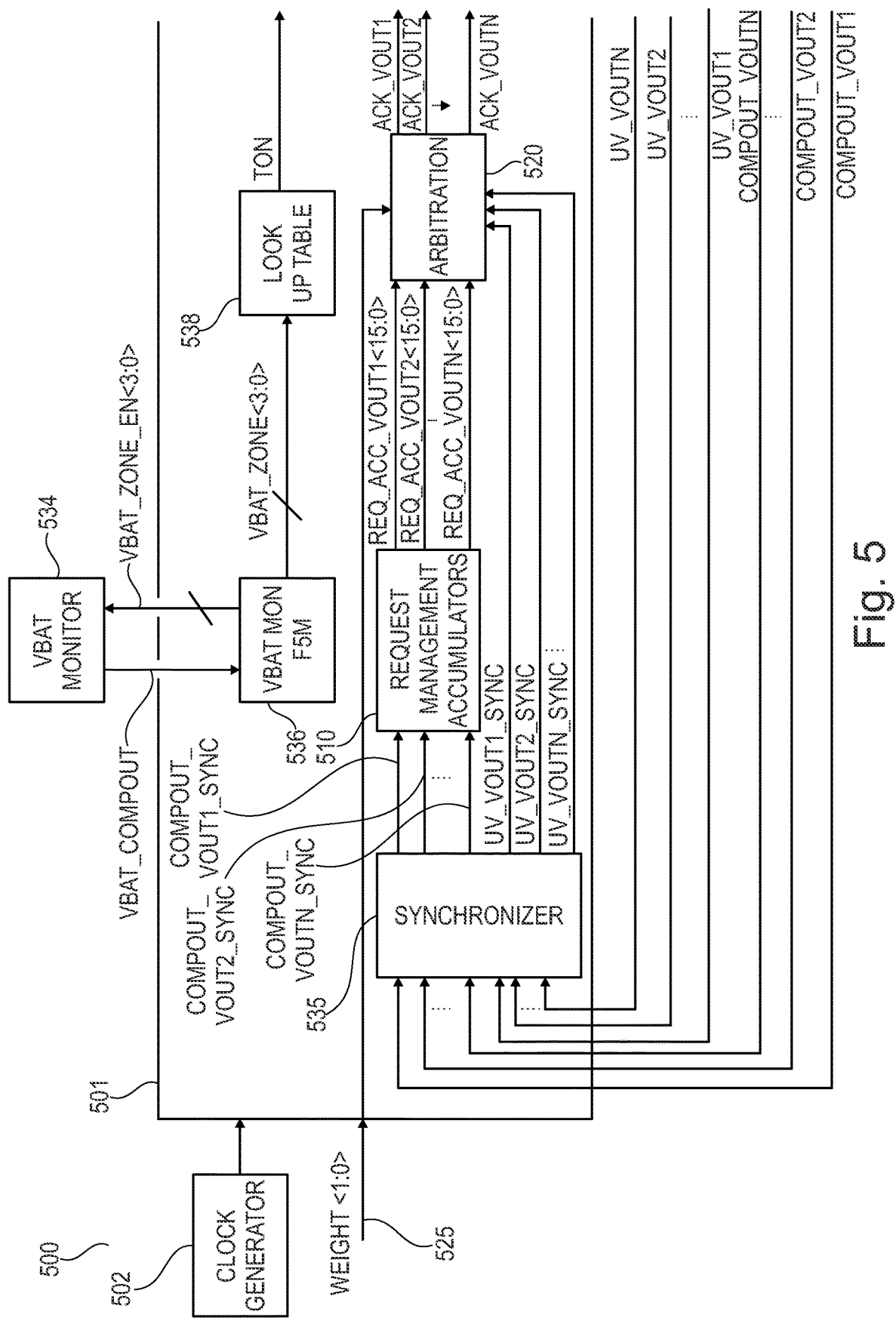
FIG. 5 shows a block diagram of a SIMO switching converter and controller in accordance with an exemplary embodiment.
Figure 5:
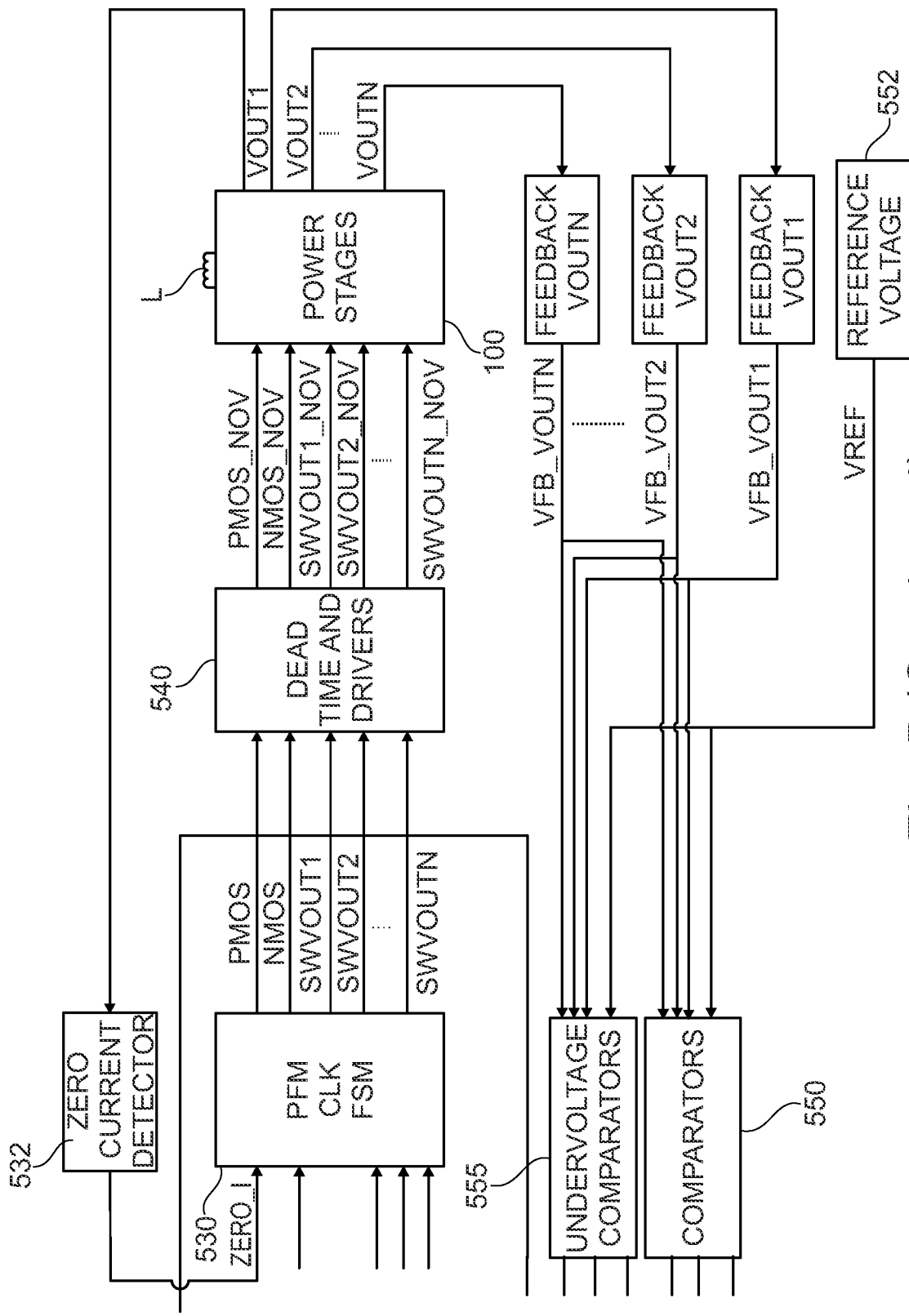

FIG. 5 shows a block diagram of a SIMO switching converter 100 and controller 500 in accordance with an exemplary embodiment. The controller 500 is generally configured to control the SIMO switching converter 100 in accordance with the method 400 described above. The controller 500 generally comprises a request management unit 510, an arbitration logic unit 520, a finite state machine 530, a synchronizer 535, a driver circuit 540 (the driver circuit 540 includes circuitry for controlling dead time and for preventing overlaps), and a set of comparators 550. The request management unit 510, arbitration logic unit 520, finite state machine 530, and the synchronizer 535 are implemented in a digital block 501 which receives a fast clock signal from clock generator 502. The set of comparators comprises one comparator for each output VOUT1, VOUT2, ..., VOUTN of the SIMO switching converter 100 in order to compare each of the corresponding output voltages (which are fed back by respective feedback units) with a corresponding reference voltage VREF provided by reference voltage unit 552. The reference voltage VREF is preferably a vector comprising an individual threshold value for each output. The comparator output signals are sent to synchronizer 535 and the synchronized comparator signals are sent to the request management unit 510 which counts a period of time (preferably as a number of clock cycles) for each of the multiple outputs of the SIMO switching converter 100 during which the corresponding output voltage has been below the corresponding threshold value. The counted (or accumulated or integrated) values are sent to the arbitration logic unit 520 which identifies that particular output for which the counted value is largest and sends a corresponding signal to the finite state machine (FSM) 530. The FSM 530 provides control signals to the driver circuit 540 which controls the switches SWPMOS, SWNMOS, SWVOUT1, SWVOUT2, ..., SWVOUTN in order to connect the identified output to the single inductor L and to supply current while charging and discharging the inductor L as described above. The arbitration logic unit 520 also receives a weighting signal 525 which may indicate that additional weight is to be applied to one or more of the outputs in the sense that the corresponding counter value is multiplied or offset in comparison to the actually counter number of clock cycles. Thereby, priority may be given to some outputs in comparison to others. Furthermore, an additional set of comparators 555 (also referred to as under voltage comparators) may be used to overrule the counter-based arbitration result in case a particularly important output is below its corresponding threshold voltage. The controller 500 further comprises a zero current detector 532 for informing the FSM 530 when the single inductor L has been completely discharged. The FSM may use this information to assure an appropriate dead time between current supply cycles. In the shown embodiment, the controller 500 further comprises a battery monitor 534 for monitoring the battery voltage VBAT, a monitoring FSM 536 for determining the level of voltage at the battery, and a look up table 538 for selecting a timing signal TON for the charging cycle of the inductor L. Here, the purpose is to select, through the look up table 538, the most efficient timing signal TON according to the battery level in order to maximize the SIMO power efficiency.

Figure 6:
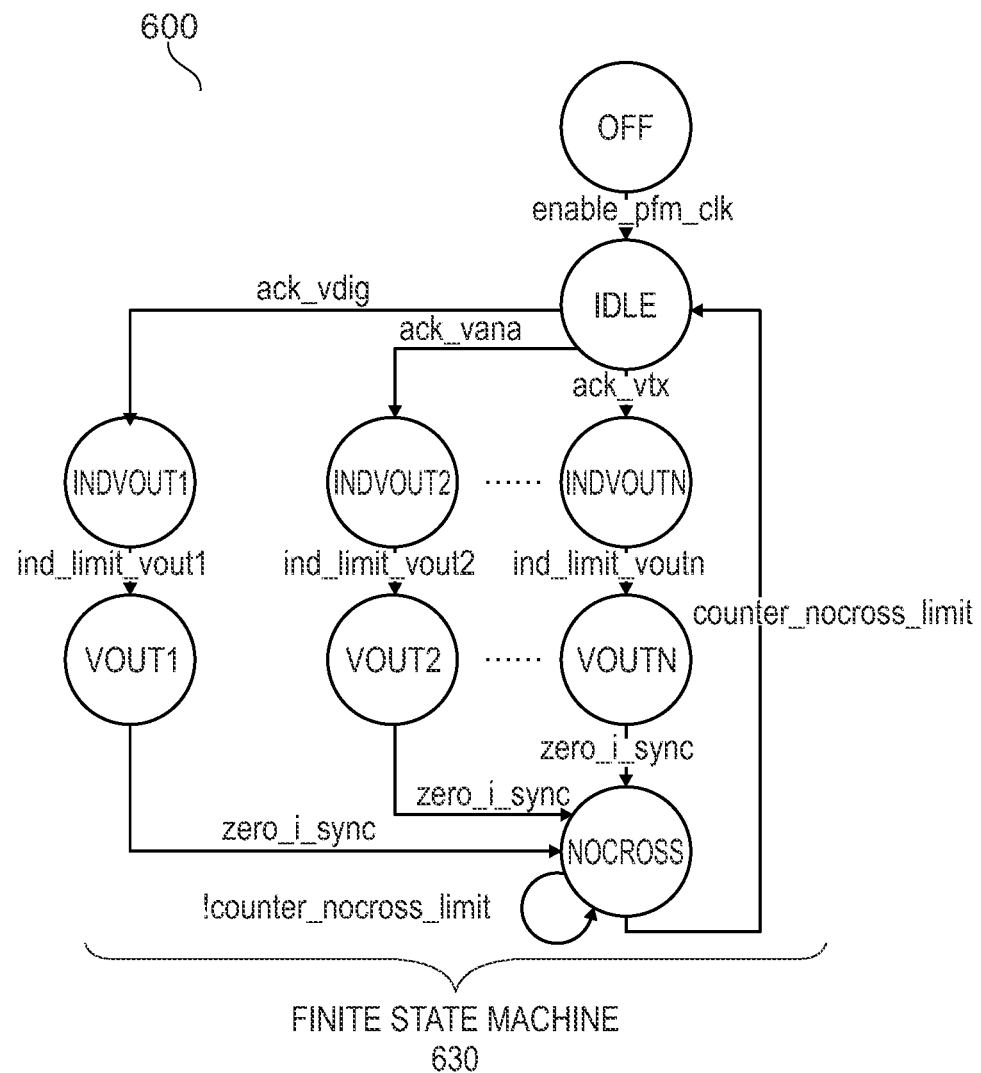
FIG. 6 shows a functional block diagram of a SIMO switching converter controller according to an exemplary embodiment.
Figure 6:
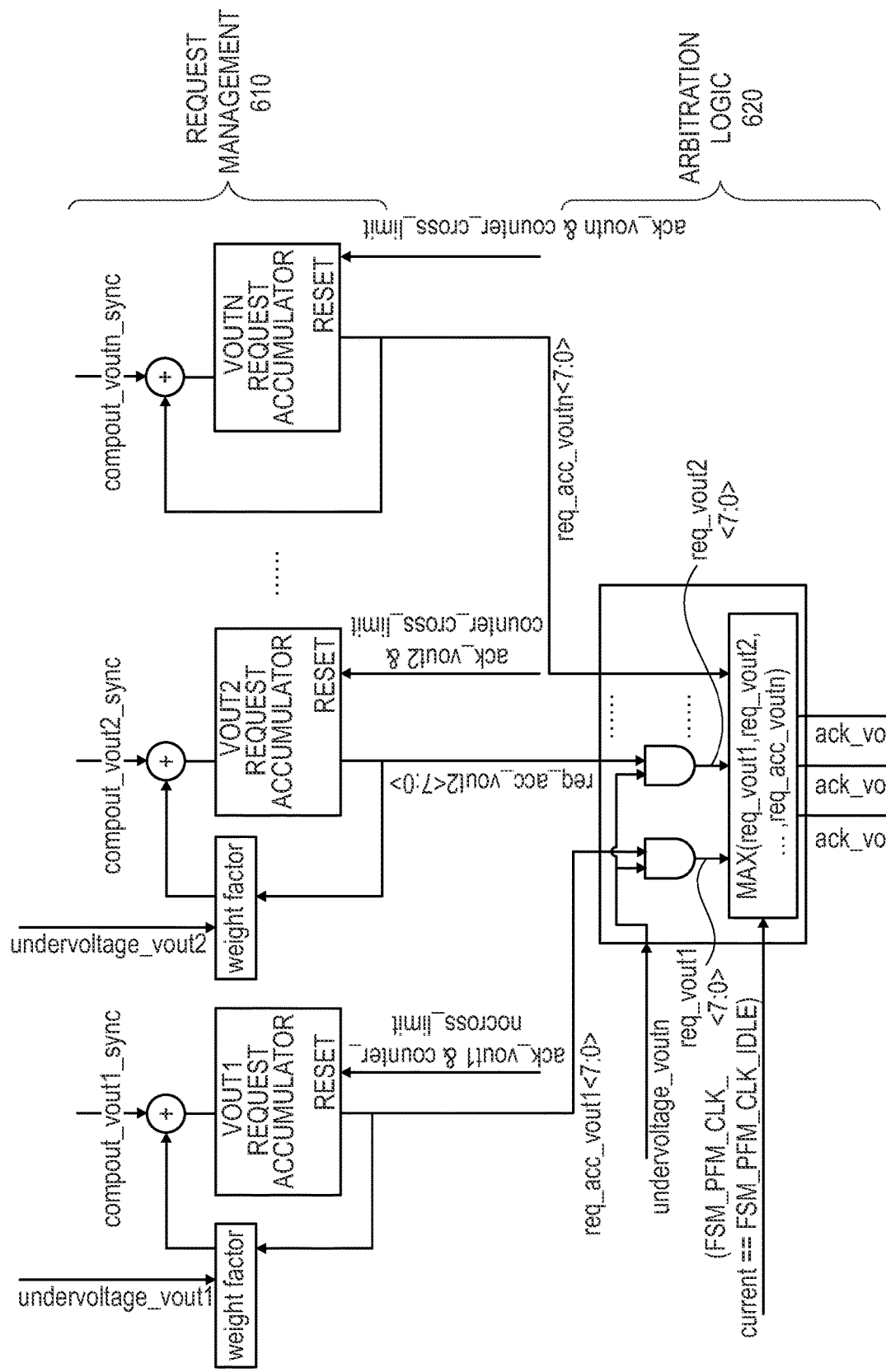

FIG. 6 shows a functional block diagram 600 of a SIMO switching converter controller 500 according to an exemplary embodiment as shown in FIG. 5 and discussed above. The functional block diagram 600 comprises a request management logic 610, an arbitration logic 620, and a finite state machine 630. The request management logic 610 receives the synchronized comparator signals and accumulates each of them until a reset signal is received. In the shown embodiment, a weighting factor is applied to the synchronized comparator signal before, during or after the counting (e.g., using accumulators) for each of the first output VOUT1 and the second output VOUT2. Each accumulating unit outputs a corresponding signal to the arbitration logic 620 which identifies the largest accumulated value and outputs corresponding acknowledgement signals ack_vout1, ack_vout2, . . . , ack_voutn to the FSM 630. In the shown embodiment, the comparator-based selection may be overruled by the n-th output, i.e. if the signal undervoltage_voutn indicates that the voltage at the n-th output is low, all other requests are masked. The FSM 630 comprises five main states:

OFF is a state in which all switches are open.

IDLE is a state in which there is no inductor current IL and an acknowledge signal corresponding to a SIMO output request defines the next inductor current charge and discharge cycle.

INDVOUTx is a state that corresponds to the inductor charge phase (x is the number of the SIMO switching converter output, i.e., an integer between 1 and N).

VOUTx is a state that corresponds to the inductor discharge phase (x is the number of the SIMO switching converter output, i.e., an integer between 1 and N).

NOCROSS is a state with a programmable duration in which there is no inductor current that serves to avoid unwanted cross regulation.

Figure 7:
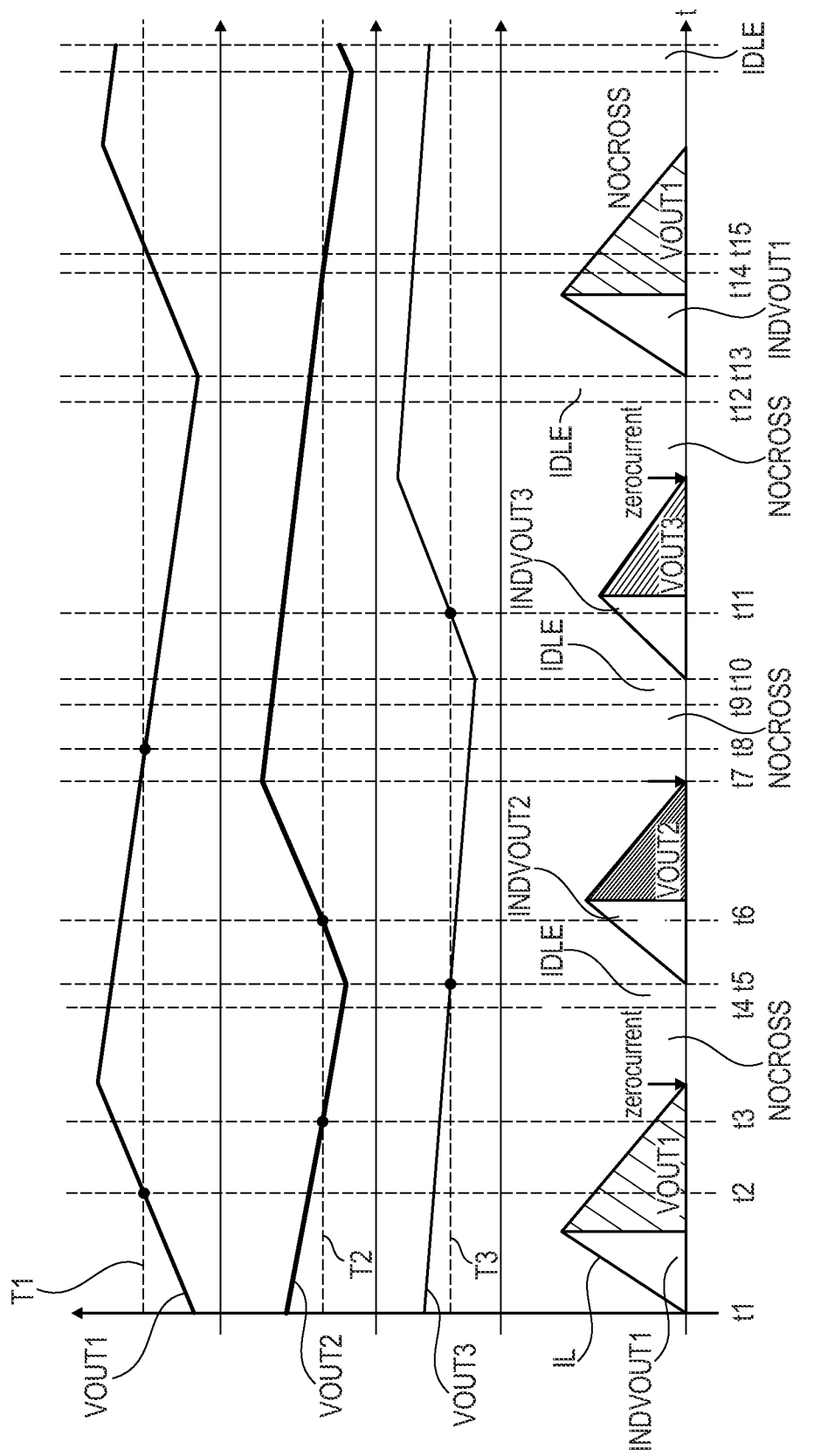
FIG. 7 shows a timing diagram of controlling a SIMO switching converter in accordance with an exemplary embodiment.
Figure 7:
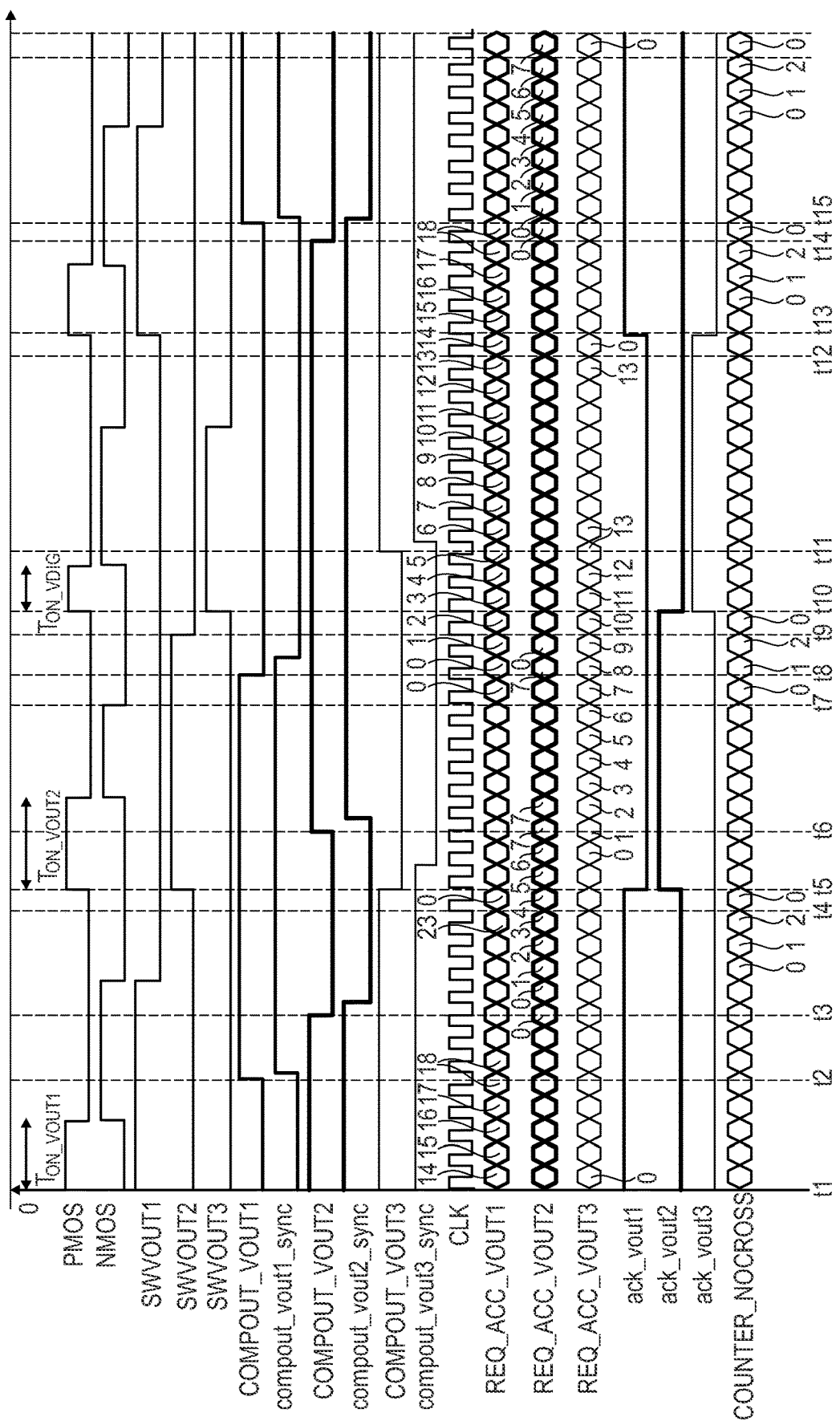

FIG. 7 shows a timing diagram of controlling a SIMO switching converter 100 in accordance with an exemplary embodiment. More specifically, FIG. 7 shows the various signals and parameters indicated in FIG. 5 and FIG. 6 in an example with three outputs with corresponding voltages VOUT1, VOUT2 and VOUT3. The corresponding threshold values or desired operating voltages are respectively indicated as T1, T2 and T3. The timing diagram begins at time t1 where VOUT1 is below its threshold value T1 and supply of this output begins by closing SWPMOS and keeping SWNMOS open such that the inductor L is being charged. Furthermore, SWVOUT1 is closed and SWVOUT2 and SWVOUT3 are kept open. The comparator signal COMPOUT_VOUT1 for VOUT1 is low and hence REQ_ACC_VOUT1 is incremented for each cycle of the fast clock CLK and ack_vout1 is high. This may in particular take place in an accumulator. After a predetermined charging time $T_{ON,\ VOUT1}$, SWPMOS is opened and SWNMOS is closed in order to discharge the inductor. At time t2, VOUT1 goes above the threshold value T1 and COMPOUT_VOUT1 therefore goes high. Shortly thereafter, at the next rising edge of CLK, the synchronized comparator signal compout_vout1_sync goes high. At time t3, VOUT2 falls below T2 and as a result of the comparator signals COMPOUT_VOUT2 and compout_vout2_sync, REQ_ACC_VOUT2 starts incrementing with each clock cycle CLK. The NOCROSS period ends at time t4 and after a short IDLE period, the counter COMPOUT_VOUT1 for VOUT1 is reset and, as a result of REQ_ACC_VOUT2 being larger than both REQ_ACC_VOUT1 and REQ_ACC_VOUT3, supply of VOUT2 is initiated by turning SWPMOS and SWVOUT2 on at time t5. At the same time, i.e., at time t5, VOUT3 falls below T3 and REQ_ACC_VOUT3 starts incrementing with each clock cycle CLK. At time t6, VOUT2 goes above the threshold value T2 and COMPOUT_VOUT2 therefore goes high. Shortly thereafter, at the next rising edge of CLK, the synchronized comparator signal compout_vout2_sync goes high. The inductor discharge ends at time t7 and the NOCROSS period begins. At time t8, VOUT1 again goes below T1 and REQ_ACC_VOUT1 starts incrementing with each clock cycle CLK. The NOCROSS period ends at time t9 and the subsequent IDLE period ends at time t10 where supply of VOUT3 is initiated since REQ_ACC_VOUT3 is now larger than both REQ_ACC_VOUT1 and REQ_ACC_VOUT2. At time t11, VOUT goes above T3 and the counting stops. The following NOCROSS period ends at time t12 and the subsequent IDLE period ends at time t13 where supply of VOUT1 is again initiated as the corresponding counter REQ_ACC_VOUT1 has the highest value. At time t14, VOUT2 falls below T2 and REQ_ACC_VOUT2 starts incrementing. At time t15, VOUT1 goes above T1 and REQ_ACC_VOUT1 stops incrementing.

The control method and corresponding controller described herein allows efficient and reliable use of a SIMO switching converter to supply several consumers. Furthermore, the concept is capable of managing priorities between the SIMO outputs without sensing output current loads, and it effectively avoids cross regulation issues by maintaining a specified period of no inductor current before starting the next charge-discharge cycle of the inductor.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also, elements described in association with different embodiments may be combined. It should also be noted that reference signs in the claims should not be construed as limiting the scope of the claims.

What is claimed is:
1. A method of controlling a single inductor multiple output (SIMO) switching converter, the method comprising:
   directly counting, for each output of the SIMO switching converter, a number of clock cycles corresponding to a period of time during which an output voltage at the respective output is below a corresponding individual threshold value;

identifying a particular output of the SIMO switching converter corresponding to a largest counted period of time; and connecting the particular output to an inductor of the SIMO switching converter to supply current from the inductor of the SIMO switching converter to the particular output.

2. The method of claim 1, further comprising:

resetting the counted number of clock cycles corresponding to the particular output to zero.

3. The method of claim 1, wherein each output of the SIMO switching converter is coupled to a corresponding comparator adapted to provide a comparator output signal indicative of whether the corresponding output voltage is below the corresponding individual threshold value, and wherein the counting comprises synchronously incrementing the counted number of clock cycles for outputs where the corresponding comparator output value indicates that the output voltage is below the corresponding individual threshold value.

4. The method of claim 3, wherein the synchronous incrementing occurs with a predetermined clock frequency which exceeds a switching frequency of the SIMO switching converter.

5. The method of claim 3, wherein the synchronous incrementing comprises incrementing the counted number of clock cycles by respective predetermined amounts, wherein the respective predetermined amount of a first output is different from the respective predetermined amount of a second output.

6. The method of claim 1, wherein current is supplied by the inductor of the SIMO switching converter to the particular output until the inductor is completely discharged.

7. The method of claim 1, further comprising:

disconnecting the particular output from the inductor and waiting for a predetermined waiting period of time before connecting a subsequently identified output to the inductor to supply current to the subsequently identified output.

8. The method of claim 1, wherein at least one output is a high-priority output, the method further comprising:

prioritizing connecting the high-priority output to the inductor of the SIMO switching converter to supply current from the inductor of the SIMO switching converter to the high-priority output over connecting the inductor of the SIMO switching converter to the particular output.

9. A controller for a single inductor multiple output (SIMO) switching converter, the controller comprising:

a request management unit configured to directly count, for each output of the SIMO switching converter, a number of clock cycles corresponding to a period of time during which an output voltage at the respective output is below a corresponding individual threshold value, value;

an arbitration logic unit configured to identify a particular output of the SIMO switching converter corresponding to a largest counted period of time; and a finite state machine configured to connect the particular output to an inductor of the SIMO switching converter to supply current from the inductor of the SIMO switching converter to the particular output.

10. The controller of claim 9, wherein the request management unit is further configured to reset the counted number of clock cycles corresponding to the particular output to zero in response to a corresponding signal from the finite state machine.

11. The controller of claim 9, wherein each output of the SIMO switching converter is coupled to a corresponding comparator adapted to provide a comparator output signal indicative of whether the corresponding output voltage is below the corresponding individual threshold value, and wherein the request management unit is further configured to synchronously increment the counted number of clock cycles for outputs where the corresponding comparator output value indicates that the output voltage is below the corresponding individual threshold value.

12. The controller of claim 11, wherein the request management unit is further configured to:

synchronously increment the counted numbers of clock cycles with a predetermined clock frequency which exceeds a switching frequency of the SIMO switching converter; and synchronously increment the counted numbers of clock cycles by respective predetermined amounts, wherein the respective predetermined amount of a first output is different from the respective predetermined amount of a second output.

13. The controller of claim 9, wherein the finite state machine is configured to disconnect the particular output from the inductor and wait for a predetermined waiting period of time before connecting a subsequently identified output to the inductor to supply current to the subsequently identified output.

14. The controller of claim 9, wherein the SIMO switching converter is a SIMO BUCK switching converter.

15. The controller of claim 9, wherein at least one output is a high-priority output, and wherein the arbitration logic unit is configured to prioritize the high-priority output over the particular output if the output voltage at the high-priority output is below the individual threshold value of the high-priority output.

16. A controller for a single inductor multiple output (SIMO) switching converter, the controller comprising:

a request management unit configured to directly count, for each output of the SIMO switching converter, a number of clock cycles corresponding to a period of time during which an output voltage at the respective output is below a corresponding individual threshold value;

a set of comparators, each comparator of the set of comparators coupled to a corresponding output of the SIMO switching converter and configured to provide a respective comparator output signal indicative of whether the corresponding output voltage is below the corresponding individual threshold value;

an arbitration logic unit configured to identify a particular output of the SIMO switching converter for corresponding to a largest number of counted clock cycles; and a finite state machine configured to connect the particular output to an inductor of the SIMO switching converter to supply current from the inductor of the SIMO switching converter to the particular output.

17. The controller of claim 16, wherein the request management unit is further configured to reset the counted number of clock cycles corresponding to the particular output to zero in response to a corresponding signal from the finite state machine.

18. The controller of claim 16, wherein the request management unit is configured to synchronously increment the counted numbers of clock cycles with a predetermined clock frequency which exceeds a switching frequency of the SIMO switching converter.

19. The controller of claim 16, wherein the finite state machine is configured to disconnect the particular output from the inductor and wait for a predetermined waiting period of time before connecting a subsequently identified output to the inductor to supply current to the subsequently identified output.

20. The controller of claim 16, wherein the SIMO switching converter is a SIMO BUCK switching converter.

* * * * *